US006692608B2

(12) United States Patent
Phillips

(10) Patent No.: US 6,692,608 B2

(45) Date of Patent: Feb. 17, 2004

(54) METHOD OF MAKING SIMULATED WOOD SHAKE SHINGLE HAVING VERTICAL SHADOW LINES

(75) Inventor: John D. Phillips, Pataskala, OH (US)

(73) Assignee: Owens Corning Fiberglas Technology, Inc., Summit, IL (US)

(*) Notice: Subject to any disclaimer, the term of this patent is extended or adjusted under 35 U.S.C. 154(b) by 101 days.

(21) Appl. No.: 09/934,915

(22) Filed: Aug. 22, 2001

(65) Prior Publication Data

US 2002/0001673 A1 Jan. 3, 2002

Related U.S. Application Data

(63) Continuation-in-part of application No. 09/607,489, filed on Jun. 30, 2000, now abandoned.

(51) Int. Cl.[7] ............................ B32B 31/00; E04D 1/20

(52) U.S. Cl. ....................... 156/260; 156/264; 156/270; 156/271; 156/276; 156/279; 156/351; 156/361; 156/512; 52/555; 52/557; 83/920; 427/187; 427/188; 118/39

(58) Field of Search ................................ 156/152, 259, 156/264, 271, 64, 276, 279, 351, 361, 378, 512, 260, 270; 83/27, 32, 920; 118/39; 52/554, 555, 557, DIG. 16; 427/289, 186, 187, 188; 428/143, 144

(56) References Cited

U.S. PATENT DOCUMENTS

| | | | | |
|---|---|---|---|---|
| 3,613,328 A | | 10/1971 | Morgan et al. | 52/585 |
| 3,624,975 A | | 12/1971 | Morgan et al. | 52/105 |
| 3,652,326 A | | 3/1972 | Ward | 428/389 |
| 3,924,047 A | | 12/1975 | Ward, Jr. et al. | 161/170 |
| 3,935,344 A | | 1/1976 | Haggerty et al. | 428/378 |
| 4,268,577 A | | 5/1981 | Fahey | 428/394 |
| 4,295,871 A | | 10/1981 | Droux et al. | 63/3.41 |
| 4,499,702 A | | 2/1985 | Turner | 52/555 |
| 4,727,096 A | | 2/1988 | Choudin | 52/217 |
| 4,830,989 A | | 5/1989 | Trivedi et al. | 501/35 |
| 5,305,569 A | | 4/1994 | Malmquist et al. | 52/309.8 |
| 5,347,785 A | | 9/1994 | Terrenzio et al. | 52/555 |
| 5,369,929 A | | 12/1994 | Weaver et al. | 52/557 |
| 5,375,387 A | | 12/1994 | Davenport | 52/557 |
| 5,426,902 A | | 6/1995 | Stahl et al. | 52/314 |
| 5,488,807 A | | 2/1996 | Terrenzio et al. | 52/555 |
| 5,666,776 A | | 9/1997 | Weaver et al. | 52/557 |
| 5,763,012 A | | 6/1998 | Zhao et al. | 427/393.5 |
| 5,860,263 A | | 1/1999 | Sieling et al. | 52/518 |
| 5,953,877 A | | 9/1999 | Kalkanoglu et al. | 52/554 |
| 5,961,780 A | | 10/1999 | Kalkanoglu et al. | 156/517 |
| 6,014,847 A | | 1/2000 | Phillips | 52/311.1 |
| 6,038,827 A | | 3/2000 | Sieling | 52/557 |
| 6,092,345 A | | 7/2000 | Kalkanoglu et al. | 52/554 |
| 6,174,403 B1 | | 1/2001 | Steiner, Jr. et al. | 156/260 |
| 6,289,648 B1 | * | 9/2001 | Freshwater et al. | 52/557 |
| 6,457,290 B1 | * | 10/2002 | Elliott | 52/557 |

* cited by examiner

*Primary Examiner*—Linda Gray

(74) *Attorney, Agent, or Firm*—Inger H. Eckert; James J. Dottavio; Maria C. Gasaway

(57) ABSTRACT

A method of making shingles includes coating a shingle mat with roofing asphalt to make an asphalt-coated sheet, and covering the asphalt-coated sheet with granules to form a granule-covered sheet along a longitudinal axis, the granule-covered sheet having a shadow patch thereon, the shadow patch having a first width along the longitudinal axis. The granule-covered sheet is divided into an overlay sheet and an underlay sheet, the shadow patch being on the underlay sheet. A pattern of tabs and cutouts is cut in the overlay sheet, one of the tabs of the pattern being a select tab having a second width along the longitudinal axis, the second width of the select tab being less than the first width of the shadow patches. The relative longitudinal positions of the shadow patch and the select tab are synchronized. The overlay sheet and the underlay sheet are laminated together, thereby covering a portion of the synchronizing shadow patch with the select tab to leave a remainder portion of the shadow patch uncovered by the select tab. Remainder portions of different widths are created on different shingles by varying the longitudinal positions of the select tab and the shadow patches with respect to each other.

13 Claims, 7 Drawing Sheets

METHOD OF MAKING SIMULATED WOOD SHAKE SHINGLE HAVING VERTICAL SHADOW LINES

CROSS REFERENCE TO RELATED APPLICATIONS

The present invention claims priority as a continuation-in-part from the U.S. patent application Ser. No. 09/607,489 entitled SHINGLE SYNCHRONIZATION BETWEEN BLEND DROP AND CUT, AND BETWEEN PATTERN AND PATTERN CUTTER, filed Jun. 30, 2000, now abandoned.

TECHNICAL FIELD

This invention relates to a method of making roofing shingles. More particularly, this invention relates to a method of producing aesthetically pleasing roofing shingles.

BACKGROUND OF THE INVENTION

The use of aesthetically pleasing roofing shingles is popular among consumers. Aesthetically pleasing roofing shingles are produced by varying the pattern of colors in the shingles as well as their length, and spacing between their tabs, cutouts, and notches. The appearance of shingles can be varied by placing colored granules in patterns at specified locations with respect to the patterns of cuts, such as length cuts and tab cuts, in the shingles. Color patterns which are misplaced at undesirable locations produce poor quality shingles. Thus, it would be desirable to produce a method of synchronizing the placement of the color patterns with respect to the tabs, cutouts, and notches in the shingles.

SUMMARY OF THE INVENTION

The above objects as well as other objects not specifically enumerated are achieved by a method of making shingles including coating a shingle mat with roofing asphalt to make an asphalt-coated sheet, and covering the asphalt-coated sheet with granules to form a granule-covered sheet along a longitudinal axis, the granule-covered sheet having a shadow patch thereon, the shadow patch having a first width along the longitudinal axis. The granule-covered sheet is divided into an overlay sheet and an underlay sheet, the shadow patch being on the underlay sheet. A pattern of tabs and cutouts is cut in the overlay sheet, one of the tabs of the pattern being a select tab having a second width along the longitudinal axis, the second width of the select tab being less than the first width of the shadow patches. The relative longitudinal positions of the shadow patch and the select tab are synchronized. The overlay sheet and the underlay sheet are laminated together, thereby covering a portion of the synchronizing shadow patch with the select tab to leave a remainder portion of the shadow patch uncovered by the select tab. Remainder portions of different widths are created on different shingles by varying the longitudinal positions of the select tab and the shadow patches with respect to each other.

According to this invention there is also provided method of making shingles, wherein the shingles include an overlay portion and an underlay portion. The method includes establishing a continuous overlay sheet having a pattern of tabs and cutouts, establishing a continuous underlay sheet having a series of shadow patches, sensing the position of the pattern of tabs and cutouts on the continuous shingle overlay sheet, sensing the position of the series of shadow patches on the continuous shingle underlay sheet, and synchronizing the position of the continuous overlay sheet with respect to the continuous underlay sheet in response to the sensed position of the pattern of tabs and cutouts and the sensed position of the series of shadow patches. The continuous overlay sheet and the continuous underlay sheet are laminated together. Remainder portions of different widths on different shingles are created by varying the positions of the continuous overlay sheet and the continuous underlay sheet with respect to each other.

According to this invention there is also provided a set of shingles having an appearance that varies from shingle to shingle, each of the shingles having an overlay sheet and an underlay sheet. Each overlay sheet has a plurality of tabs, at least one of the tabs being a select tab. Each underlay sheet has one or more shadow patches, at least one of the shadow patches of each shingle defining a remainder portion when the select tab covers a portion of the at least one shadow patches. The positions of the select tab and the shadow patches vary with respect to each other from shingle to shingle, thereby causing the appearance of the remainder portion to vary from shingle to shingle.

According to this invention there is also provided a set of shingles having an appearance that varies from shingle to shingle, where each shingle has a plurality of tabs, at least one of the tabs being a select tab. Each shingle has one or more shadow patches, at least one of the shadow patches of each shingle defining a remainder portion when the select tab covers a portion of the at least one shadow patches. The relative longitudinal positions of the select tab and at least one shadow patch vary with respect to each other from shingle to shingle, thereby causing the appearance of the remainder portion to vary from shingle to shingle.

Various objects and advantages of this invention will become apparent to those skilled in the art from the following detailed description of the preferred embodiment, when read in light of the accompanying drawings.

DETAILED DESCRIPTION OF THE INVENTION

Composite shingles, such as asphalt shingles, are a commonly used roofing product. Asphalt shingle production generally includes feeding a base material from a roll fed downstream and coating it first with a composite material, then a layer of granules. The base material is typically made from a fiberglass mat provided in a continuous shingle membrane or sheet. It should be understood that the base material can be any suitable support material.

The composite material, such as an asphalt material, is added to the continuous shingle membrane for strength and improved weathering characteristics. The composite material can be any suitable material, preferably low in cost, durable, and resistant to fire. The layer of granules is typically applied with one or more granule applicators, such as pneumatic blenders, to the asphalt material covering the continuous shingle membrane. The pneumatic blender is a type of granule applicator known in the art. The granules shield the asphalt material from direct sunlight, offer resistance to fire, and provide texture to the shingle. The granules can be colored in a way known in the art, preferably before being applied to the asphalt coated continuous shingle membrane. The granules are preferably applied to the continuous shingle membrane in color patterns to provide the shingles with an aesthetically pleasing appearance.

Figure 1:
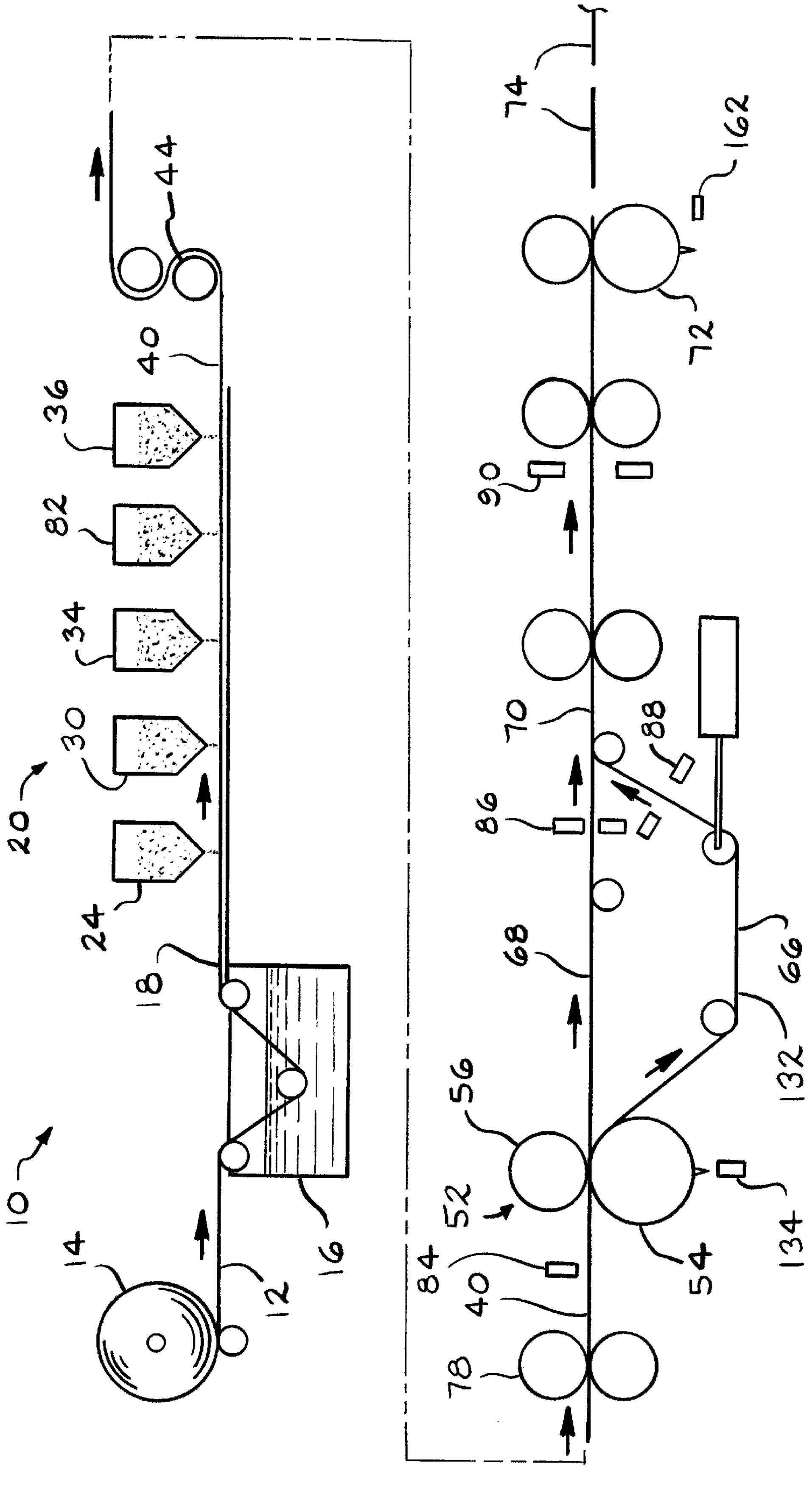
FIG. 1 is a schematic elevational view of an apparatus for making shingles according to the invention.
Figure 2:
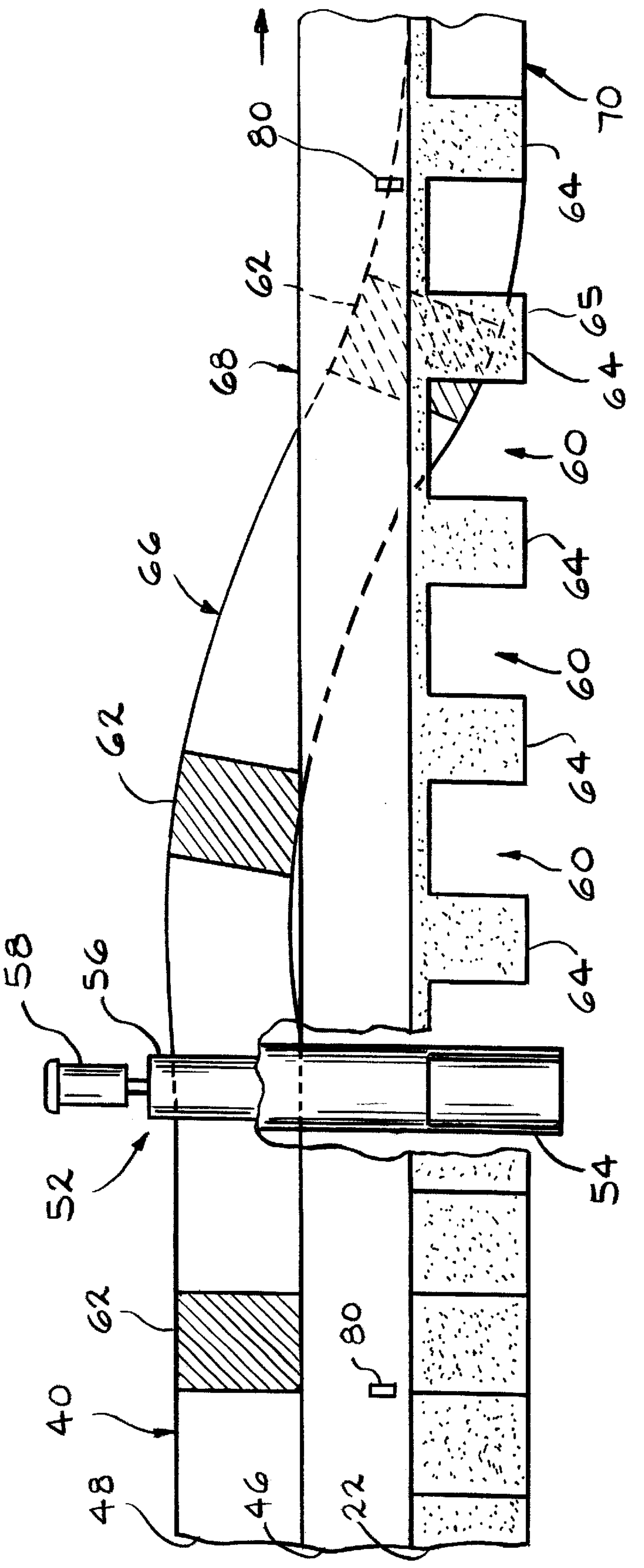
FIG. 2 is a plan view of a portion of the apparatus of FIG. 1, showing the laminating of the shingle underlay beneath the overlay to make a laminated strip.
Figure 3:
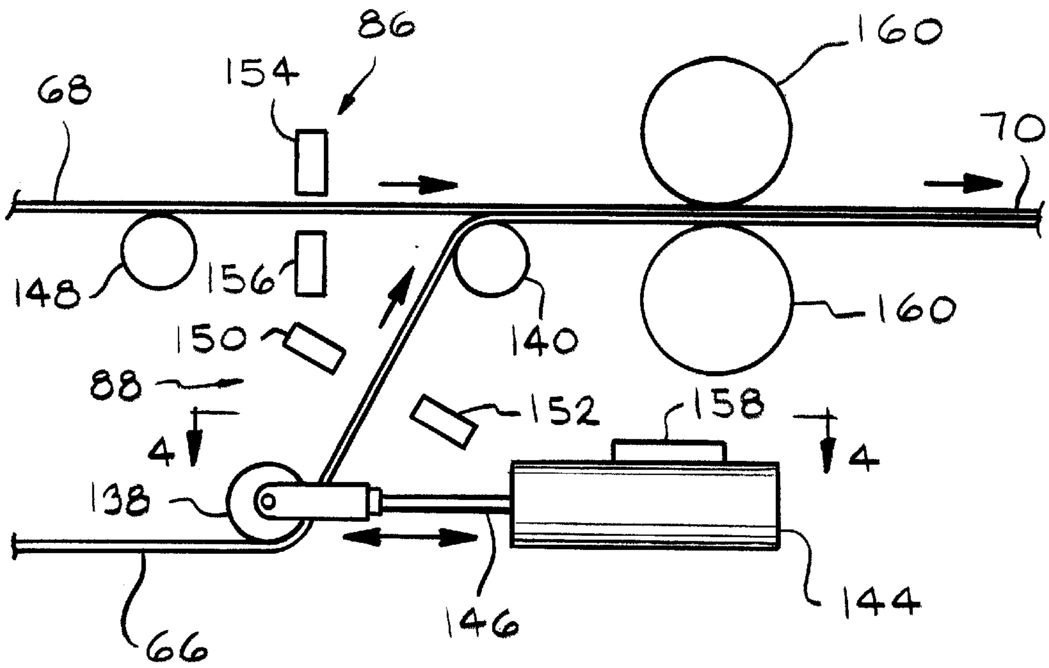
FIG. 3 is an enlarged elevational view of a portion of the shingle making apparatus of FIG. 1.
Figure 4:
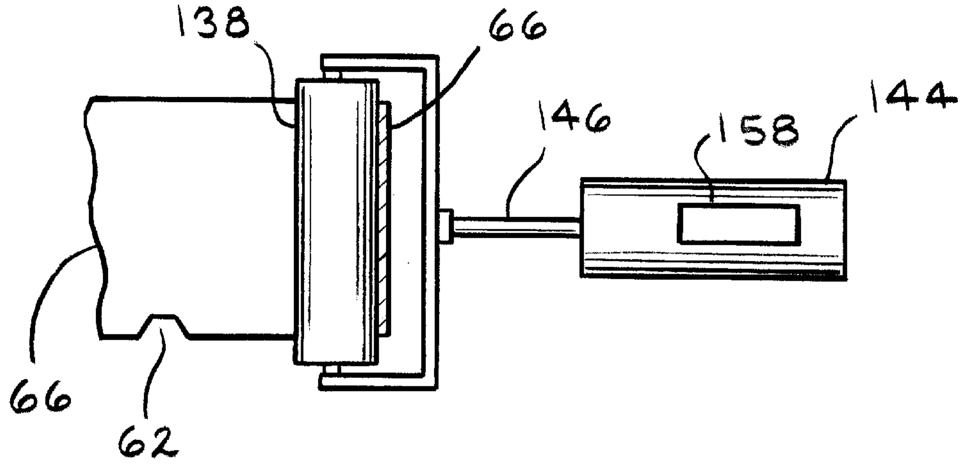
FIG. 4 is a plan view of a portion of the apparatus of FIG. 3.

The description and drawings disclose a method for synchronizing the placement of color patterns with tabs in shingles. Referring now to the drawings, there is shown in FIGS. 1 and 2 an apparatus 10 for manufacturing a roofing material according to the invention. The illustrated manufacturing process involves passing a continuous sheet of shingle mat 12 in a machine direction (indicated by the arrows) through a series of manufacturing operations. The shingle mat 12 preferably moves at a speed of at least about 200 feet/minute (61 meters/minute), and typically at a speed within the range of between about 450 feet/minute (137 meters/minute) and about 800 feet/minute (244 meters/minute). The shingle mat 12 may move at any acceptable speed.

In a first step of the manufacturing process, the shingle mat 12 is payed out from a roll 14. The shingle mat 12 can be any type known for use in reinforcing asphalt-based roofing materials, such as a nonwoven web of glass fibers. The shingle mat 12 is then fed through a coater 16 where an asphalt coating is applied to the shingle mat 12. The asphalt coating can be applied in any suitable manner. In the illustrated embodiment, the shingle mat 12 is submerged in a supply of hot, melted asphalt coating to completely cover the sheet with the tacky coating. However, in other embodiments, the asphalt coating could be sprayed on, rolled on, or applied to the shingle mat 12 by other means. Typically, the asphalt material is highly filled with a ground stone filler material, amounting to at least about 60 percent by weight of the asphalt/filler combination.

The resulting asphalt-coated sheet 18 is then passed beneath one or more granule dispensers 20 for the application of granules to the upper surface of the asphalt-coated sheet 18. FIG. 1 shows five granule dispensers 24, 30, 34, 82 and 36, although any suitable number of granule dispensers may be employed. The granule dispensers 24, 30, 34, 82 and 36 can be of any type suitable for depositing granules onto the asphalt-coated sheet 18. A preferred granule dispenser is a granule blender of the type disclosed in U.S. Pat. No. 5,599,581 to Burton et al. The initial granule dispenser 24 deposits partial blend drops of background granules of a first color blend on the tab portion 22 of the asphalt-coated sheet 18 in a pattern that sets or establishes the trailing edge of subsequent blend drops of a second color blend (of an accent color) and a third color blend (of a different accent color). For purposes of this patent application, the first color blend and the background granules are synonymous. The use of initially applied partial blend drops to define the trailing edge of subsequent blend drops is useful where accurate or sharp leading edges are possible, but accurate trailing edges at high shingle manufacturing speeds are difficult. This technique of using initially applied partial blend drops is disclosed in U.S. Pat. No. 5,405,647 to Grubka et al.

Blend drops applied to the asphalt-coated sheet 18 are often made up of granules of different colors. By way of illustration, one particular blend drop that may simulate a weathered wood appearance might actually consist of some brown granules, some dark gray granules and some light gray granules. When these granules are mixed together and applied to the asphalt-coated sheet 18 in a generally uniformly mixed manner, the overall appearance of weathered wood is achieved. For this reason, the blend drops are referred to as having a color blend, which gives an overall color appearance, and this overall appearance may be different from any of the actual colors of the granules in the color blend. Also, blend drops of darker and lighter shades of the same color, such as, for example, dark gray and light gray, are referred to as different color blends rather than merely different shades of one color.

After being treated with the granules, the asphalt-coated sheet 18 becomes a granule-covered sheet 40. The asphalt-coated sheet 18 can then engage a slate drum 44 to press the granules into the granule-covered sheet 40. The slate drum 44 also is operative to temporarily invert the granule-covered sheet 40, thereby assisting in gravity removal of the excess granules. The granule-covered sheet 40 is preferably fed through a rotary pattern cutter 52. The rotary pattern cutter 52 preferably includes a bladed cutting cylinder 54, backup roll 56 and a motor 58, as shown in FIGS. 1 and 2. In a preferred embodiment, the pattern cutter 52 cuts a series of tabs 64 and cutouts 60 in the tab portion 22 of the granule-covered sheet 40. At least one of the tabs 64 is a select tab 65. In a preferred embodiment, at least one of the granule dispensers 20 is positioned to deposit a shadow patch 62 on the granule-covered sheet 40, preferably on the underlay portion 48. The shadow patch 62 may be applied to the granule-covered sheet 40 in any suitable manner.

The pattern cutter 52 also cuts, or divides, the granule-covered sheet 40 into a continuous underlay sheet 66 and a continuous overlay sheet 68. In a preferred embodiment, the shadow patch 62 is positioned on the underlay sheet 66. As shown in FIG. 2, the underlay sheet 66 is directed to be aligned beneath the overlay sheet 68, and the underlay sheet 66 and the overlay sheet 68 are laminated together to form a continuous laminated sheet 70. As shown in FIG. 1, the underlay sheet 66 is routed on a longer path than the path of the overlay sheet 68. Further downstream, the continuous laminated sheet 70 is passed into contact with a rotary length cutter 72 that cuts the laminated sheet into individual laminated shingles 74.

In order to facilitate synchronization of the cutting and laminating steps, various sensors and controls can be employed. A timing mark 80 can be applied to an appropriate part of the shingle, such as the headlap portion 46, to be used for synchronization. The timing mark can be applied by any means, and can be a thin blend drop of granules applied by the timing mark blender 82. The timing mark 80 is preferably white colored granules, but can be any suitable light-colored material, such as paint, chalk, or the like. The timing mark 80 can be sensed by a sensor, such as a photoeye 84, for synchronization of the shadow patch 62 and the tab 64. In a preferred embodiment, the continuous granule-covered sheet 40 is fed through pull rolls 78 that regulate the speed of the granule-covered sheet 40 as the granule-covered sheet 40 moves downstream. In a preferred embodiment, at least one of the pull rolls 78 is driven by a motor (not shown).

Sensors, such as photoeyes 86 and 88 can be used to synchronize the continuous underlay sheet 66 with the continuous overlay sheet 68. Sensors 90 can be used to synchronize the notches and cutouts of the continuous laminated sheet with the end cutter or length cutter 72. An inductive pickup sensor 134 detects the rotary position of the cutting cylinder 54. Any suitable type of sensor may be used to detect the rotary position of the cutting cylinder. Signals from the timing mark sensor 84 and the pattern cutter sensor 134 can be routed to a controller, not shown, or any other means for controlling the relative positions of the timing marks 80 and the pattern cutter, to synchronize the position of the continuous granule covered sheet and the rotary pattern cutter with respect to each other. The timing mark can be placed on the sheet at intervals corresponding with each tab, or alternatively corresponding with a larger pattern, such as the pattern of a whole shingle or even the pattern of a whole cycle of shingles, similar to the cycle of shingles disclosed in U.S. Pat. No. 5,102,487, referred to above.

The pattern of colored granules on the granule-covered sheet 40 and the cutting cylinder 54 can be misaligned or out of synchronization with respect to each other during the manufacturing process. The synchronization can be achieved by adjusting the rate of rotation of the cutting cylinder 54 and/or by adjusting the rate at which the granule-covered sheet 40 moves downstream. Because the pull rolls 78 can regulate the rate of speed of the granule-covered sheet 40, synchronization can be done by adjusting the rate at which the pull rolls 78 move the granule-covered sheet 40.

Referring now to FIGS. 1–4, after the granule-covered sheet 40 is divided, the continuous shingle underlay sheet 66 is preferably directed downstream through an underlay pathway 132 from the pattern cutter 52 to a moveable idler roll 138 and a joining roll 140. The underlay pathway is configured to change directions around the idler roller 138. The length of the underlay pathway is the distance the continuous shingle underlay sheet 66 travels from the pattern cutter 52 to the joining roll 140. The moveable idler roll 138 is attached to an actuator 144 by an arm 146. The actuator moves the arm 146 to modulate the underlay pathway distance.

A layer of adhesive may be applied to a lower surface of the overlay sheet 68 by an adhesive applicator roll 148. The layer of adhesive causes the underlay sheet 66 to adhere to the overlay sheet 68 to form the continuous laminated sheet 70. In a preferred embodiment, the overlay sheet 68 and underlay sheet 66 are joined at the joining roll 140. When joined, the pattern of tabs 64 in the overlay sheet 68 is preferably aligned with the shadow patch 62 in the underlay sheet 66.

The underlay photoeye sensor 88 can be any suitable type of sensor for sensing the pattern of the underlay sheet 66. Preferably the photoeye 88 has a transmitter 150 and a receiver 152 for sensing the presence of the shadow patches 62 in the underlay sheet 66. The photoeye sensor 88 is preferably positioned downstream of the pattern cutter 52 along the underlay pathway 132. Also, in a preferred embodiment, the photoeye sensor 88 is positioned between the moveable idler roll 138 and the joining roll 140. Both of the photoeyes 86, 88 are connected to a controller 158, and an error signal is generated when a misalignment or lack of synchronization of the underlay with respect to the overlay is sensed. This lack of synchronization can occur for various reasons, such as variations in sheet tension and changes in product characteristics.

The position of the shingle overlay sheet 68 is synchronized with respect to the position of the shingle underlay sheet 66. An example of lack of synchronization is when the leading edges of the shadow patches 62 and the leading edge of the tab 64 reach the photoeyes 88, 86 respectively at different times. Although in the embodiment of the invention shown the sensing is focused on the shadow patch 62 and the tab 64, in the broadest sense of the invention, the synchronization includes comparing the sensed occurrence (e.g. the beginning) of any two suitable portions of a shingle. For example the sensed occurrences of the shadow patch 62 and the tab 64 may be compared. Likewise, the sensed occurrences of the shadow patch 62 and the select tab 65 may be compared. In a preferred embodiment, an error signal indicative of the distance by which the shadow patch 62 is offset with respect to the tab 64 may be generated. The synchronizing of the position of the continuous overlay sheet with respect to the continuous underlay sheet may be done approximately randomly. The synchronizing of the position of the continuous overlay sheet 68 with respect to the continuous underlay sheet 66 may also be done according to a pattern.

Synchronization can be accomplished by increasing or decreasing the underlay pathway distance, either in response to the error signal or in response to a signal from the controller, as will be discussed below. The actuator 144 is electrically controlled and is connected to the controller 158. The actuator 144 moves the arm 146 attached to the idler roll 138, thus modulating the total distance of the underlay pathway 132. The newly established pathway distance is maintained until a new signal is generated, at which time a the idler roll 138 will be moved again. It is to be understood that other devices can be used to re-establish registration once a change in synchronization is required. An error in synchronization includes instances where the pattern is not positioned as desired. Various other rollers, not shown, can be used to change the length of the underlay pathway. In the event the underlay and overlay are mated using an offline process, the re-establishment of synchronization could include speeding up or slowing down either the overlay sheet 68 or the underlay sheet 66, or both.

In a preferred embodiment, combining rolls 160 are provided downstream from the joining roll 140. The combining rolls 160 can be operated to press the continuous shingle overlay sheet 68 together with the continuous shingle underlay sheet 66 to form the continuous laminated sheet 70. The continuous laminated sheet 70 is then cut into shingles 74 by a length cutter 72. The length cutter 72 can be provided with an end cut sensor 162 for determining the synchronization of the length cutter 72 with respect to the pattern on the shingle 74. One method of accomplishing this is to connect the end cut sensor 162 to the controller.

Figure 5:
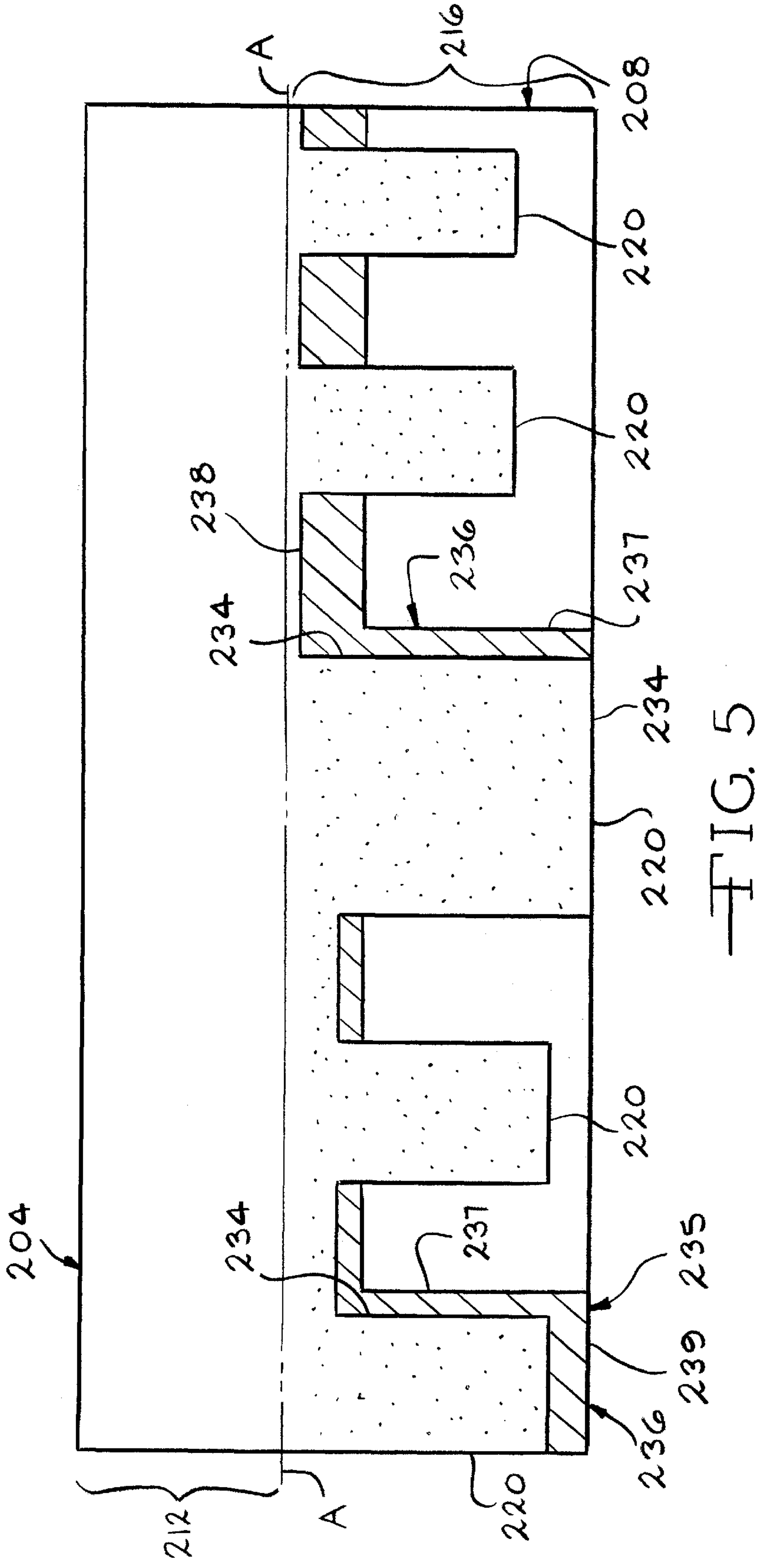
FIG. 5 is a plan view of a shingle according to the invention.
Figure 6:
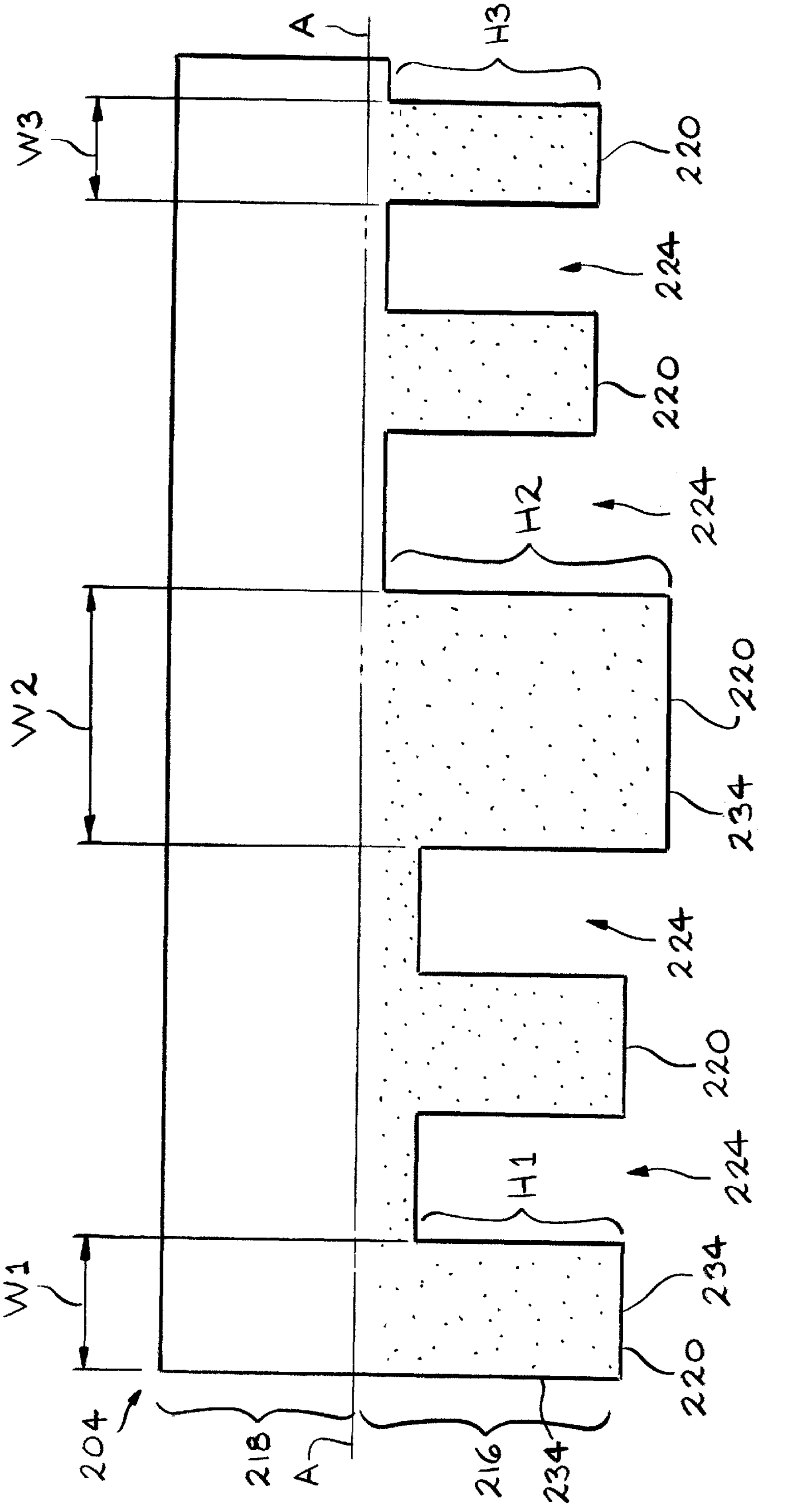
FIG. 6 is a plan view of an overlay sheet of the shingle shown in FIG. 5.
Figure 7:
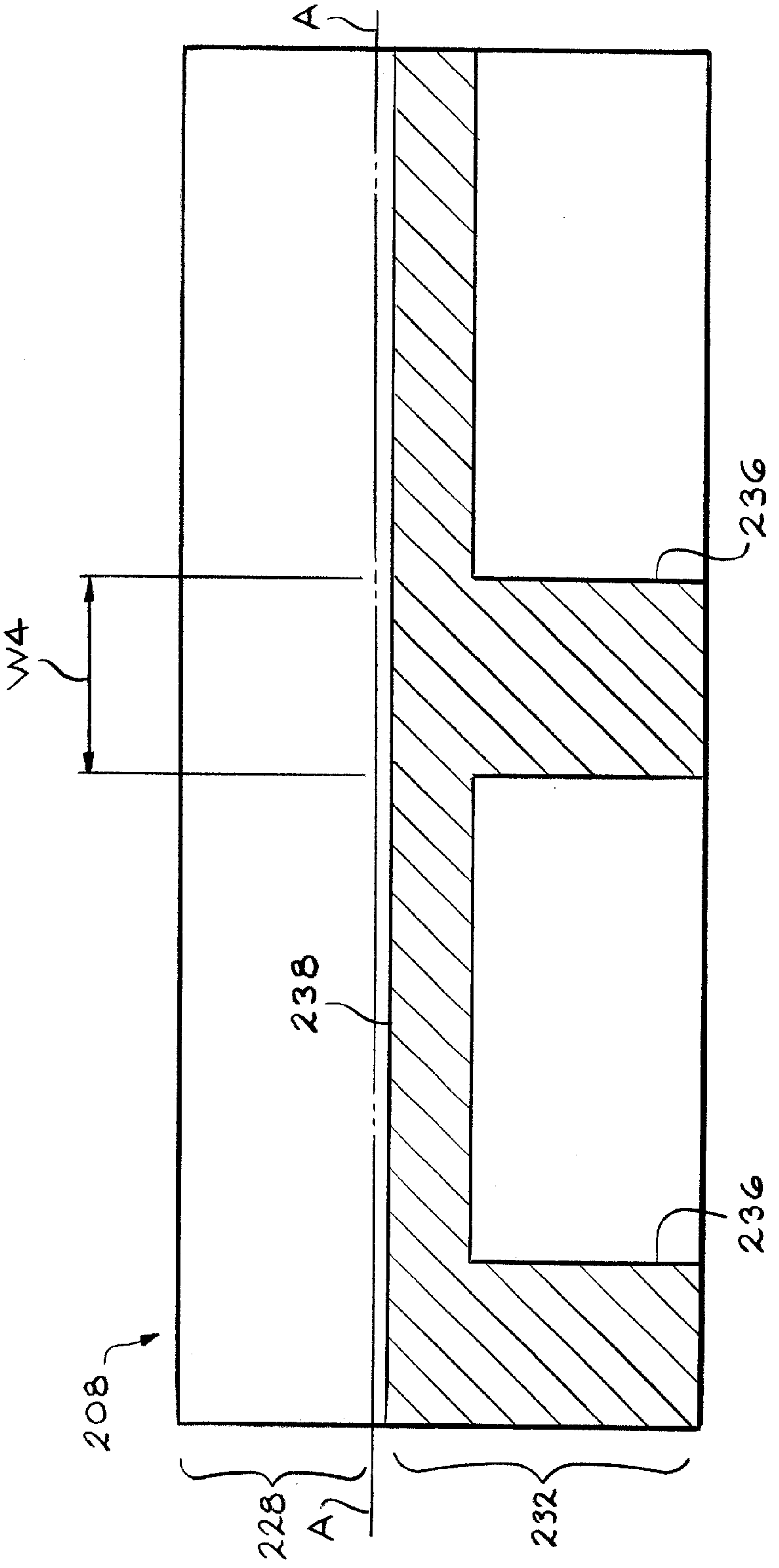
FIG. 7 is a plan view of an underlay sheet of the shingle shown in FIG. 5.

The method described above is useful for manufacturing roofing shingles. Alternate embodiments of the apparatus 10 and method of manufacturing roofing shingles according to the invention are contemplated. Referring now to FIGS. 5, 6 and 7, a shingle 200 is shown. The shingle 200 includes a longitudinal axis A—A. The shingle 200 includes an overlay sheet 204 fixed to an underlay sheet 208. The overlay sheet 204 includes a headlap portion 212 and a tab portion 216. The tab portion 216 for the illustrated overlay sheet 204 includes five tabs 220, although any suitable number of tabs 220 may be employed. The headlap portion 212 and the tabs 220 may include one or more granule patterns thereon. The tabs 220 include widths along the longitudinal axis A—A. It will be noted that the tabs 220 may be of differing widths, such as the illustrated widths W1, W2, and W3. The widths W1, W2, and W3 are first widths. Likewise, the tabs 220 may be of differing heights, such as the illustrated heights H1, H2, and H3. The tab portion 216 also defines one or more cutouts 224. The cutouts 224 include widths along the longitudinal axis A—A which may be the same widths as or different widths from the widths of the tabs 220. At least one of the tabs 220 is a select tab 234, as will be more fully discussed below.

The underlay sheet 208 likewise includes a headlap portion 228 and a tab portion 232. The underlay sheet 208 includes at least one shadow patch 236. One of the shadow patches 236 has a width W4. The width W4 is a second width. The underlay sheet 208 also preferably includes a headliner shadow 238, which is part of the shadow patch 236.

When the overlay sheet 204 is positioned over, and preferably fixed to, the underlay sheet 208, the select tab 234 covers a portion of the shadow patch 236. A portion of the shadow patch 236 is uncovered, and therefore visible. It will be appreciated that the select tab 234 is the tab 220 that covers a portion of the shadow patch 236. The overlay sheet 204 may employ more than one select tab 234 as desired. It will be noted that the width W4 of the shadow patch 236 is greater than the width W1 of the select tab 234. The shadow patch 236 is preferably a quadrilateral region. In a preferred embodiment, the shadow patch 236 is darker or denser in pattern than the pattern of the tabs 220 which the shadow patch 236 borders. A portion of the shadow patch 236 is covered with the select tab 234 to leave a remainder portion 235 of the shadow patch 236 uncovered by the select tab 234. The remainder portion 235 of the shingle 200 is visible, or otherwise detectable. As shown, the remainder portion 235 has a vertical portion 237. The vertical portion 237 of the remainder portion 235 is positioned approximately perpendicular to the longitudinal axis A—A. Also, since the height H1 of select tab 234 is less than the height of the underlay 208, the remainder portion 235 has a horizontal or longitudinal portion 239. The longitudinal portion 239 of the remainder portion 235 is positioned approximately parallel to the longitudinal axis A—A.

It should be noted that the relative longitudinal positions of the shadow patch 236 and the select tab 234 are synchronized. The term "synchronize" as used here includes to cause two or more structures or portions thereof to agree or coincide in time or in space. For example, at least one of the shadow patch 236 and the select tab 234 are synchronized when the shadow patch 236 and the select tab 234 are positioned as desired with respect to each other. Synchronization does not require that each shingle look the same, since it is the intention of the invention for the appearance of the shingles to vary.

The position of the shadow patch 236 and the position of the select tab 234 can be synchronized in a similar manner to that shown for the shingle overlay sheet 68 and the shingle underlay sheet 66 discussed above. For example, synchronization may employ the photoeyes 88, 86 with the controller 158 and the actuator 144 to move the arm 146 and the idler roll 138. The position of the shadow patch 236 and the position of the shadow select tab 234 can be synchronized in any suitable manner. The synchronizing of the position of the shadow patch 236 and the select tab 234 may be done approximately randomly. The synchronizing of the position of the shadow patch 236 and the select tab 234 may also be done according to a pattern.

Referring now to FIGS. 8–12, a set of shingles 240, 244, 248, 252, and 256 is shown. The appearance of the shingles varies from shingle to shingle. The set of shingles shown is representative of a number of any number shingles that can be used in the creation of an aesthetically pleasing roofing product. The shingles 240, 244, 248, 252, and 256 include the longitudinal axis A—A. The shingles 240, 244, 248, 252, and 256 include the overlay sheet 204 fixed to the underlay sheet 208. The overlay sheet 204 includes a plurality of tabs 220, including at least one select tab 234. The select tab 234 for the illustrated shingles 240, 244, 248, 252, and 256 defines a width W5. The width W5 for the illustrated shingles 240, 244, 248, 252, and 256 is generally about the same width. It should be noted that the width W5 need not be the same width, but instead may vary. The select tab 234 for the illustrated shingles 240, 244, 248 and 252 also defines a height H4 and a height H5 for the illustrated shingle 256. The underlay sheet 208 includes a shadow patch 236, and may include more than one shadow patch 236.

Figure 8:
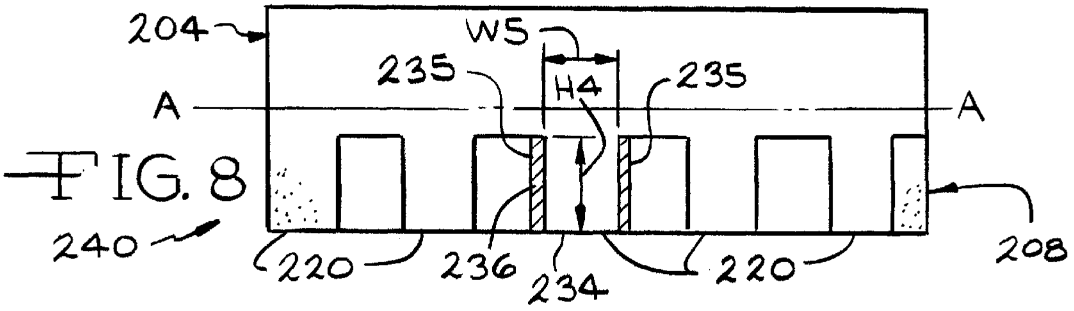
FIG. 8 is a plan view of a different shingle according to the invention.
Figure 9:
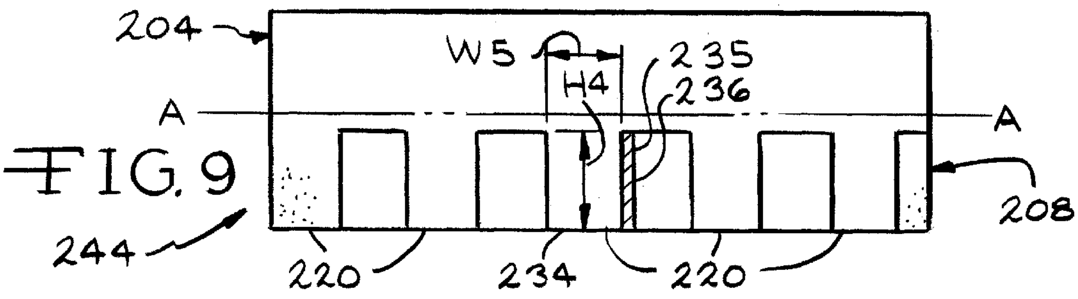
FIG. 9 is a plan view of another shingle according to the invention.
Figure 10:
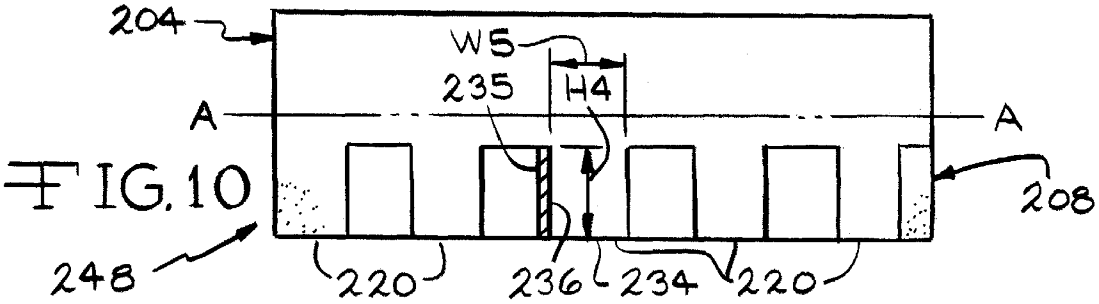
FIG. 10 is a plan view of another shingle according to the invention.
Figure 11:
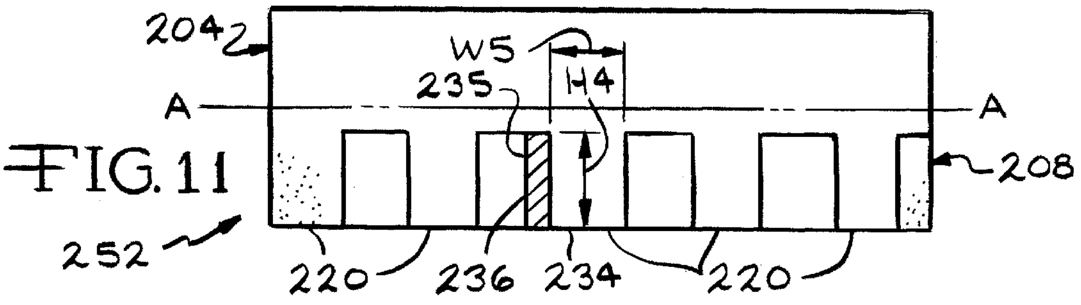
FIG. 11 is a plan view of another shingle according to the invention.

The remainder portion 235 of the shadow patch 236 for the shingle 240 of FIG. 8 is visible on two opposing sides of the select tab 234 along the longitudinal axis A—A. The two parts of the remainder portion 235 are arranged generally vertically and are positioned along the longitudinal axis A—A with respect to the select tab 234. The remainder portion 235 of the shadow patch 236 for the shingle 244 of FIG. 9 is visible on one side of the select tab 234. The remainder portion 235 of the shadow patch 236 for the shingle 248 of FIG. 10 is also visible on one side of the select tab 234. The remainder portion 235 of the shadow patch 236 for the shingle 252 of FIG. 11 is visible on the other side of the select tab 234, the same side as the shingle 248 of FIG. 10. It will be appreciated that the width of the remainder portion 235 of the shadow patch 236 for the shingle 252 of FIG. 11 is greater along the longitudinal axis A—A compared to the width of the remainder portion 235 of the shadow patch 236 for the shingle 248 of FIG. 10.

Figure 12:
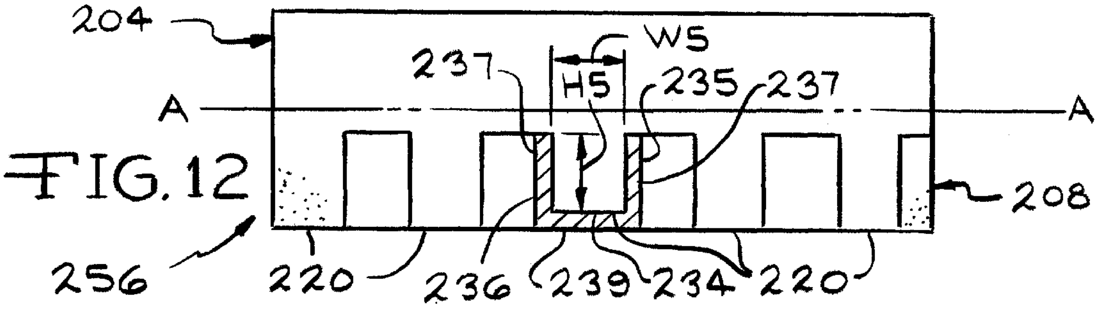
FIG. 12 is a plan view of yet another shingle according to the invention.

Referring now to FIG. 12, it will be appreciated that the remainder portion 235 of the shadow patch 236 for the shingle 256 is visible on the two opposing sides of the select tab 234 along the longitudinal axis A—A. It will also be appreciated that the remainder portion 235 is also visible along a bottom edge (as viewed in FIG. 12) of the select tab 234. Comparing the height H4 of the select tab 234 of the shingle 240 to the height H5 of the select tab 234 of the shingle 256 it will be appreciated that the height H5 is less than the height H4. This difference in heights allows the remainder portion 235 of the shadow patch 236 for the shingle 256 to be visible along the bottom edge of the select tab 234 of the shingle 256. The remainder portion 235 shown in FIG. 12 includes the vertical portions 237 and the longitudinal portion 239. The vertical portion 237 of the remainder portion 235 is positioned approximately perpendicular to the longitudinal axis A—A. The longitudinal portion 239 of the remainder portion 235 is positioned approximately parallel to the longitudinal axis A–A.

Comparing the shingles 240, 244, 248, 252, and 256, it will be noted it is possible to vary the longitudinal positions of one or both of the select tab 234 and the shadow patch 236 with respect to the other of the select tab 234 and the shadow patch 236. The longitudinal positions can be varied by moving the select tab 234, moving the shadow patch 236, or moving both the select tab 234 and the shadow patch 236.

One example of how the synchronization can be done approximately randomly can be understood by comparing the positions of the remainder portions 235 of FIG. 11 and FIG. 8. As the shadow patch 236 of FIG. 11 is shifted slightly to the right (as viewed in FIG. 11) relative to the select tab 234 along the longitudinal axis A—A, the shadow patch 236 of the type seen in FIG. 8 is produced. Likewise the appearance of the remainder portions 235 changes from a single-sided, relatively wider remainder portion 235 in FIG. 11 to a two-sided "split" appearing remainder portion 235 in FIG. 8. Similarly, as the shadow patch 236 seen in FIG. 8 is shifted slightly to the right (as viewed in FIG. 9) along the longitudinal axis A—A, the shadow patch 236 of the type seen in FIG. 9 is produced. In other words, the appearance of the two-sided "split" appearing remainder portion 235 in FIG. 8 changes to the appearance of the single-sided remainder portion 235 in FIG. 9. The difference in the appearances of the shingles can be produced as desired to make an aesthetically pleasing roofing product.

The actuator 144 connected to the controller 158 can be employed to synchronize the position of the shadow patch 236 and the select tab 234 approximately randomly. The controller 158 can be connected to a random signal generator (not shown), which provides a random signal for movement of the arm 146 within specified limits. The random signal generator may be biased to position the shadow patch 236 so as to position the remainder portion 235 on predominantly one side of the select tab 234. The remainder portion 235 does not have to be evenly distributed, but may instead be unevenly distributed with respect to the select tab 234. Optionally, a motor (not shown), preferably a servomotor, may be used to move the arm 146 in response to the random signal from the random signal generator.

The synchronizing of the position of the shadow patch 236 and the select tab 234 may also be done according to a pattern. One example of how the synchronization can be done according to a pattern can be understood by comparing the positions of the remainder portions 235 of FIGS. 8–11. The pattern will show how the appearance of primarily the remainder portions 235 changes from one shingle to another. As the shadow patch 236 seen in FIG. 11 is shifted slightly to the right (as viewed in FIG. 11) along the longitudinal axis A—A, the shadow patch 236 seen in FIG. 10 is produced. It will be noted that the remainder portion 235 of FIG. 11 is wider than the remainder portion 235 of FIG. 10. Even minor changes in the difference in the widths, and thus changes in the appearances of the shingles, can be produced as desired to make an aesthetically pleasing roofing product.

Comparing the shadow patch 236 seen in FIG. 10 to the shadow patch 236 seen in FIG. 8, it will be appreciated that the appearance of the shadow patch 236 has been changed, thereby altering the appearance of the remainder portion 235. Specifically, the appearance of the single-sided remainder portion 235 in FIG. 10 has changed to the appearance of the two-sided "split" appearing remainder portion 235 in FIG. 8. Comparing the shadow patch 236 seen in FIG. 8 to the shadow patch 236 seen in FIG. 9, it will be appreciated that the appearance of the remainder portion 235 has been changed, thereby altering the appearance of the remainder portion 235. Specifically, the appearance of the two-sided "split" appearing remainder portion 235 in FIG. 8 has changed to the appearance of the single-sided remainder portion 235 in FIG. 9. The synchronization according to the pattern can be continued by altering the appearance shadow patch 236 to produce the two-sided "split" appearing remainder portion 235 seen in FIG. 8, then to produce the appearance of the single-sided remainder portion 235 in FIG. 10, then to produce the appearance of the slightly wider single-sided remainder portion 235 in FIG. 11. Thus, synchronization done according to the pattern can be done so as to create an aesthetically pleasing roofing product. It should be understood that the synchronization can be done according to any suitable pattern, and is not limited to the pattern presented here.

The position of the shadow patch 236 and the position of the shadow select tab 234 can be synchronized in any suitable manner. For example, speeding up or slowing down either the overlay sheet 68 or the underlay sheet 66 (shown in FIG. 1) may be used to synchronize the position of the shadow patch 236 and the position of the shadow select tab 234. Alternatively, speeding up or slowing down both the overlay sheet 68 and the underlay sheet 66 may be used to synchronize the position of the shadow patch 236 and the position of the shadow select tab 234. The speeding up or slowing down of the overlay sheet 68 can be done with the speed modulator 91. The speeding up or slowing down of the underlay sheet 66 can also be done with the speed modulator 92. Likewise, synchronization may be done by modulating the total distance of the underlay pathway 132 as the actuator 144 moves the arm 146 attached to the idler roll 138 (shown in FIG. 4).

In an alternate embodiment of the invention, the set of shingles 240, 244, 248, 252, and 256 shown in FIGS. 8–12 could be produced of a single layer of roofing material. The shingles could be produced from the granule-covered sheet 40 shown in FIG. 1 and FIG. 2 or any other suitable manner. The asphalt-coated sheet 18 or the shingle mat 12 of FIG. 1 could also be used as the single layer of roofing material. The shingles would provide the same aesthetically pleasing roofing appearance. The one or more shadow patches 236, the tabs 220, the select tab 234, and the remainder portion 235 can be created by one or more granule dispensers 20, sprayers (not shown), printers (not shown), applicators (not shown) or by any other suitable manner. The relative longitudinal positions of the select tab 234 and the remainder portion 235 vary with respect to each other from shingle to shingle. When the single layer of roofing material is employed, use of both the overlay sheet 204 and the underlay sheet 208 shown in FIGS. 5, 6 and 7 is not needed to produce the shingles.

The principle and mode of operation of this invention have been described in its preferred embodiments. However, it should be noted that this invention may be practiced otherwise than as specifically illustrated and described without departing from its scope.

What is claimed is:

1. A method of making shingles comprising:

coating a shingle mat with roofing asphalt to make an asphalt-coated sheet;

covering the asphalt-coated sheet with granules to form a granule-covered sheet along a longitudinal axis, the granule-covered sheet having a shadow patch thereon formed during covering, the shadow patch having a first width along the longitudinal axis;

dividing the granule-covered sheet into an overlay sheet and an underlay sheet, the shadow patch being on the underlay sheet;

cutting a pattern of tabs and cutouts in the overlay sheet, one of the tabs of the pattern being a select tab having a second width along the longitudinal axis, the second width of the select tab being less than the first width of the shadow patch;

synchronizing the relative longitudinal positions of the shadow patch and the select tab;

laminating the overlay sheet and the underlay sheet, including covering a portion of the synchronizing shadow patch with the select tab to leave a remainder portion of the shadow patch uncovered by the select tab, creating remainder portions of different widths on different shingles by varying the longitudinal positions of the select tab and the shadow patch with respect to each other; and cutting said laminated overlay and underlay sheet into one or more laminated shingles.

2. The method of claim 1, further comprising the step of providing a series of shadow patches on the granule covered sheet, each of the shadow patches having a position and respective width along the longitudinal axis, and wherein the step of synchronizing of the position of the series of shadow patches and the select tab is done approximately randomly.

3. The method of claim 1, further comprising the step of providing a series of shadow patches on the granule covered sheet, each of the shadow patches having a position and respective width along the longitudinal axis, and wherein the step of synchronizing of the position of the series of shadow patches and the select tab is done according to a pattern.

4. The method of claim 1 wherein the first width of the shadow patch is a constant width.

5. The method of claim 1 wherein the remainder portion of at least one of the shadow patch is synchronized with the select tab of the overlay sheet.

6. The method of claim 1 wherein the remainder portion includes a vertical portion positioned approximately perpendicular to the longitudinal axis of the granule-covered sheet.

7. The method of claim 1 wherein the remainder portion includes a longitudinal portion positioned approximately parallel to the longitudinal axis of the granule-covered sheet.

8. A method of making shingles, wherein the shingles include an overlay portion and an underlay portion comprising:

establishing a continuous overlay sheet having a pattern of tabs and cutouts;

establishing a continuous underlay sheet having a series of shadow patches;

sensing the position of the pattern of tabs and cutouts on the continuous shingle overlay sheet;

sensing the position of the series of shadow patches on the continuous shingle underlay sheet;

synchronizing the position of the continuous overlay sheet with respect to the continuous underlay sheet in response to the sensed position of the pattern of tabs and cutouts and the sensed position of the series of shadow patches;

laminating the continuous overlay sheet and the continuous underlay sheet;

cutting said continuous laminated overlay and said continuous underlay sheet into one or more laminated shingles; and creating remainder portions of different widths on different shingles by varying the positions of the continuous overlay sheet and the continuous underlay sheet with respect to each other.

9. The method of claim 8 wherein the synchronizing of the position of the continuous overlay sheet with respect to the continuous underlay sheet is done approximately randomly.

10. The method of claim 8 wherein the synchronizing of the position of the continuous overlay sheet with respect to the continuous underlay sheet is done according to a pattern.

11. The method of claim 8 wherein the remainder portion of at least one of the shadow patches is generally aligned with the pattern of tabs of the overlay sheet.

12. The method of claim 8 wherein the shingles include a longitudinal axis and the remainder portion includes a vertical portion positioned approximately perpendicular to the longitudinal axis.

13. The method of claim 8 wherein the shingles include a longitudinal axis and the remainder portion includes a longitudinal portion positioned approximately parallel to the longitudinal axis.

* * * * *